(12) United States Patent
Zhou

(10) Patent No.: US 11,928,088 B1
(45) Date of Patent: Mar. 12, 2024

(54) MACHINE-LEARNED MODELS FOR PREDICTING DATABASE APPLICATION TABLE GROWTH FACTOR

(71) Applicant: SAP SE, Walldorf (DE)

(72) Inventor: Deng Zhou, Neckargemund (DE)

(73) Assignee: SAP SE, Walldorf (DE)

( * ) Notice: Subject to any disclaimer, the term of this patent is extended or adjusted under 35 U.S.C. 154(b) by 50 days.

(21) Appl. No.: 17/961,260

(22) Filed: Oct. 6, 2022

(51) Int. Cl.
  *G06F 16/00* (2019.01)
  *G06F 16/21* (2019.01)
  *G06F 16/25* (2019.01)

(52) U.S. Cl.
  CPC .......... *G06F 16/213* (2019.01); *G06F 16/256* (2019.01)

(58) Field of Classification Search
  None
  See application file for complete search history.

(56) References Cited

U.S. PATENT DOCUMENTS

| | | | |
|---|---|---|---|
| 2019/0102562 A1* | 4/2019 | Yasutome | H04L 63/20 |
| 2019/0141398 A1* | 5/2019 | Auxer | H04N 21/472 |
| 2020/0242179 A1* | 7/2020 | Mukai | G06F 16/9538 |
| 2021/0294700 A1* | 9/2021 | Smaldone | G06F 11/1464 |

* cited by examiner

*Primary Examiner* — Anhtai V Tran
(74) *Attorney, Agent, or Firm* — SCHWEGMAN LUNDBERG & WOESSNER, P.A.

(57) ABSTRACT

In an example embodiment, machine learning models are trained and used to predict a growth classification of time fields and category fields of application tables of Enterprise Resource Planning (ERP) software databases. These predictions can then be used to forecast future technological needs or the future table size more precisely.

20 Claims, 9 Drawing Sheets

MACHINE-LEARNED MODELS FOR PREDICTING DATABASE APPLICATION TABLE GROWTH FACTOR

BACKGROUND

Enterprise Resource Planning (ERP) software integrates into a single system various processes used to run an organization, such as finance, manufacturing, human resources, supply chain, services, procurement, and others. These processes typically provide intelligence, visibility, and efficiency across most if not all aspects of an organization. One Example of ERP software is SAP® S/4 HANA from SAP SE of Walldorf, Germany.

ERP software is typically made up of multiple applications that share a single database.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
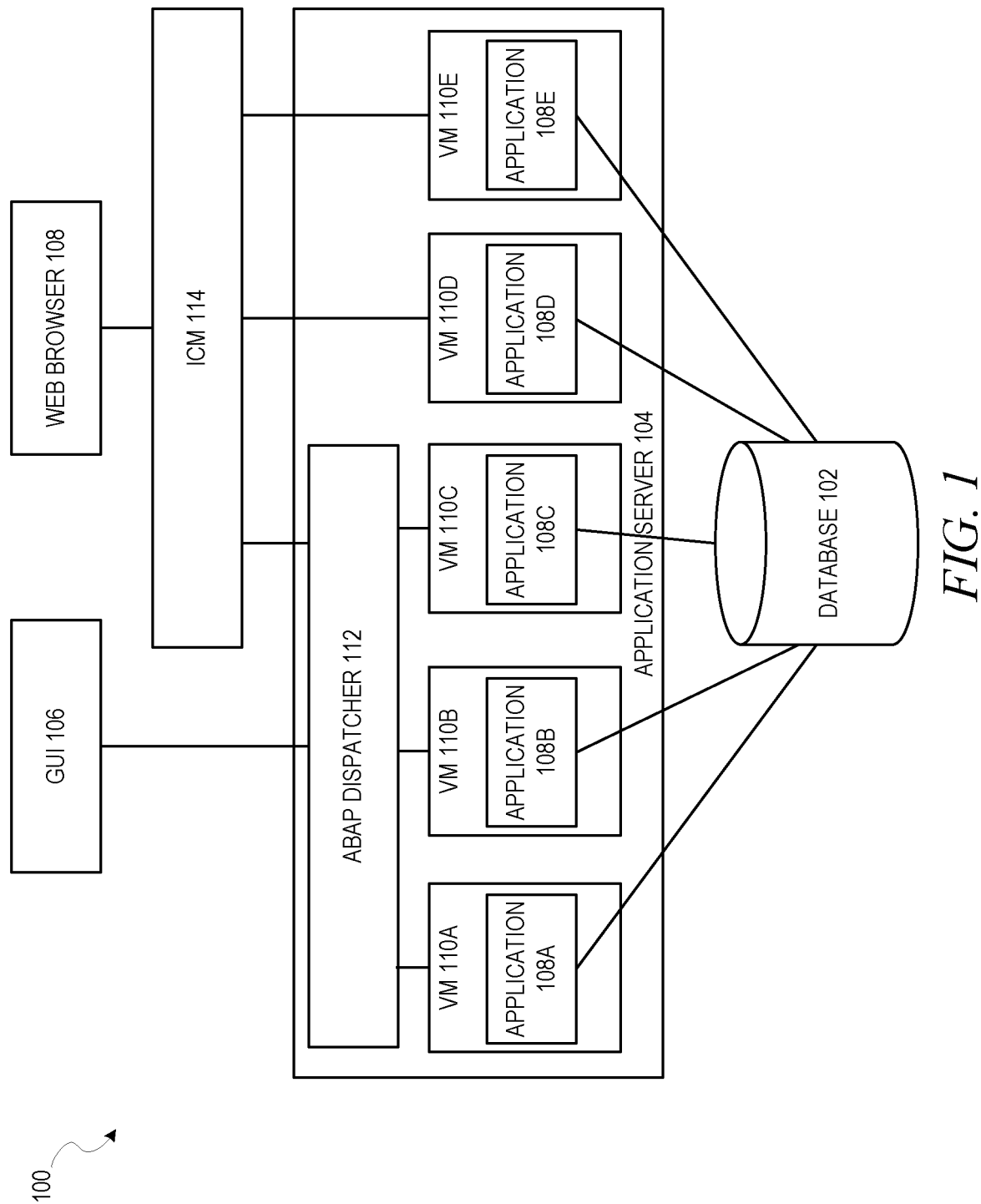
FIG. 1 is a block diagram illustrating an ERP system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, machine learning models are trained and used to predict a growth pattern of an application table in an Enterprise Resource Planning (ERP) software database. These predictions can then be used to forecast future technological needs or the future table size more precisely. More specifically, additional machine learned models are able to the use these growth patterns to first predict a correlation between the sizes of a top N number of application tables in the ERP software database and the size of the ERP software database as a whole, and then predict a size for the top N number of application tables. These predictions may then be combined to derive a prediction of the size of the ERP software database.

A distinction is made between an application table, which is a table that is written to by an application program, and a system table, which is a table that is not written to by an application program (but is written to, for example, by the database management software and may be used to aid in the management of the application tables). This distinction is relevant because system tables typically do not change in size significantly, and thus are not predictive of a growth trend for a database.

The predicted size of an ERP software database can be used in a number of different ways. In a typical ERP software database, the size of the database increases as new records are generated. Users are also able to perform archiving activities to archive the records out of the application tables to reduce the size of the database. The prediction of the size of the database over time can be useful, therefore, in recommending how urgently the user needs to begin archiving operations, or whether they need to change their current archiving and/or new record addition behavior in the near future to avoid having the database grow beyond a certain size, such as a size beyond which database performance will suffer or storage space becomes unreasonably expensive, or if it is simply challenging technologically to add additional memory to the database. Thus, for example, it would be useful to predict after how many months the database will be "full" if the user keeps their ERP software database (and corresponding archiving or data reduction operations) performing as-is.

Nevertheless, the present disclosure focuses on the machine learning models specifically trained for the prediction of growth pattern and driving factors of application tables, regardless of how these predictions are used.

Growth and volume can be driven by multiple factors, such as by time and/or other factors such as volume of business units. The business units can be defined differently in different industries. In the retail industry, business units can include individual stores. In the financial reporting industry, business units can include the number of company codes or the number of active users.

In an example embodiment, two machine learning models are used. The first, called a time field classification model, is trained to take one or more time fields of an application table as input and output a prediction of a likelihood that each of the one or more time fields are good candidates as predictors for growth. This may include providing a classification of each time field, with the classifications in decreasing order of how good the time field is as a predictor of growth. For example, classification A may indicate the time field is a good predictor of growth, classification B may indicate the time field is a worse predictor of growth than classification A, classification C may indicate the time field is a worse predictor of growth than classification B, and classification D may indicate the time field is a worse predictor of growth than classification C.

Training data for the time field classification model may include histograms of record counts collected from different customers, different application tables, and different time fields.

The training data may be compiled by first examining the data types of the application tables to identify fields in the application tables that are of a "time type". The time type is a type indicating that the values in that field are time-based, such as times and dates. Examples of fields that may be of the time type include, for example, creation date, billing date, payment date, and due date. The values in the corresponding tables are then examined and organized into histograms of record counts based on time intervals. In an example embodiment, the time interval may be a month. Thus, for example, if an application table contains four time-type fields (creation date, billing date, payment date, and due date), then a first histogram is created showing all records for creation date, organized by month (e.g., April 2020 had 2405 records, May 2020 had 153 records, etc.). A second histogram is then created showing all records for billing date, again organized by month. Third and fourth histograms are then created for payment date and due date respectively. For the training data, these classifications may be provided when the data is actually obtained. For evaluation data, the time field classification model itself predicts the classifications.

The histograms are then scaled. In an example embodiment, the histograms are then converted to images. Converting the histograms to images allows them to be used more efficiently for training of the time field classification model. These images are then passed to a machine learning algorithm to train the time field classifier model.

The second machine learning model is called a growth driver classifier, which is trained to take time fields that have been classified as good candidates as predictors of growth and also take one or more category fields in the application table(s) and predict whether each of the one or more category fields are good predictors of growth. It also may use training data, which may include histograms of distinct value counts of each of the one or more category fields, organized by each of the time fields that were classified as good candidates. A category field may be a field that has the "character" type as a data type. Examples of category fields include business name and store identifier. Thus, for a field like store identifier, a different histogram is generated for each combination of the store identifier field and any time field classified as a good candidate for being a predictor of growth (either by the time field classification model, or elsewhere). It should be noted that "good candidate" in this context can be defined as equal to or better than any particular classification described earlier. Thus, for example, if there are four possible classifications of time field prediction likelihood—classifications A, B, C, and D—it is possible that "A" may be set as the cutoff, meaning that only time fields with classifications A are considered. Alternatively, if "C" is the cutoff, then time fields with any of classifications A, B, or C are considered. This cutoff may be set at any classification level, depending upon how restrictive it is desired that the growth driver classifier be.

Thus, for example, assume that only time fields with a classification of A are considered, and then if store identification is a category field, with creation date and due date as the time fields that received a classification of A, then a first histogram is created for the store identification/creation date combination and a second histogram is created for the store identification/due date combination. The data in each of these histograms may again be grouped by interval (e.g., one month). Thus, the first histogram may indicate that, for example, there were 3 distinct values for store identification in records where the creation date value was in April 2020, 6 distinct values for store identification in records where the creation date value was May 2020, and so on. These histograms may also be scaled and converted to image format, and then used to train a growth driver classifier model to classify each of the one or more classifier fields.

FIG. 1 is a block diagram illustrating an ERP system 100, in accordance with an example embodiment. The ERP system 100 may include a database 102, an application server 104, a graphical user interface (GUI) 106 and a web browser 108. The GUI 106 and the web browser 108 are alternative ways for a user to communicate with the application server 104. The database 102 and application server 104 may be located on one or more servers in a cloud environment.

The application server 104 includes one or more ERP applications 108A-108E. Here, the applications 108A-108E each run on their own virtual machine 110A-110E, and may be accessed using commands in Advanced Business Application Programming (ABAP) language, via an ABAP dispatcher 112, or using commands in Java from an Internet Communication Manager (ICM) 114. Notably, all of the applications 108A-108E access the same database 102, which has a size. It is this size that the machine learned models of the present solution will attempt to predict.

Figure 2:
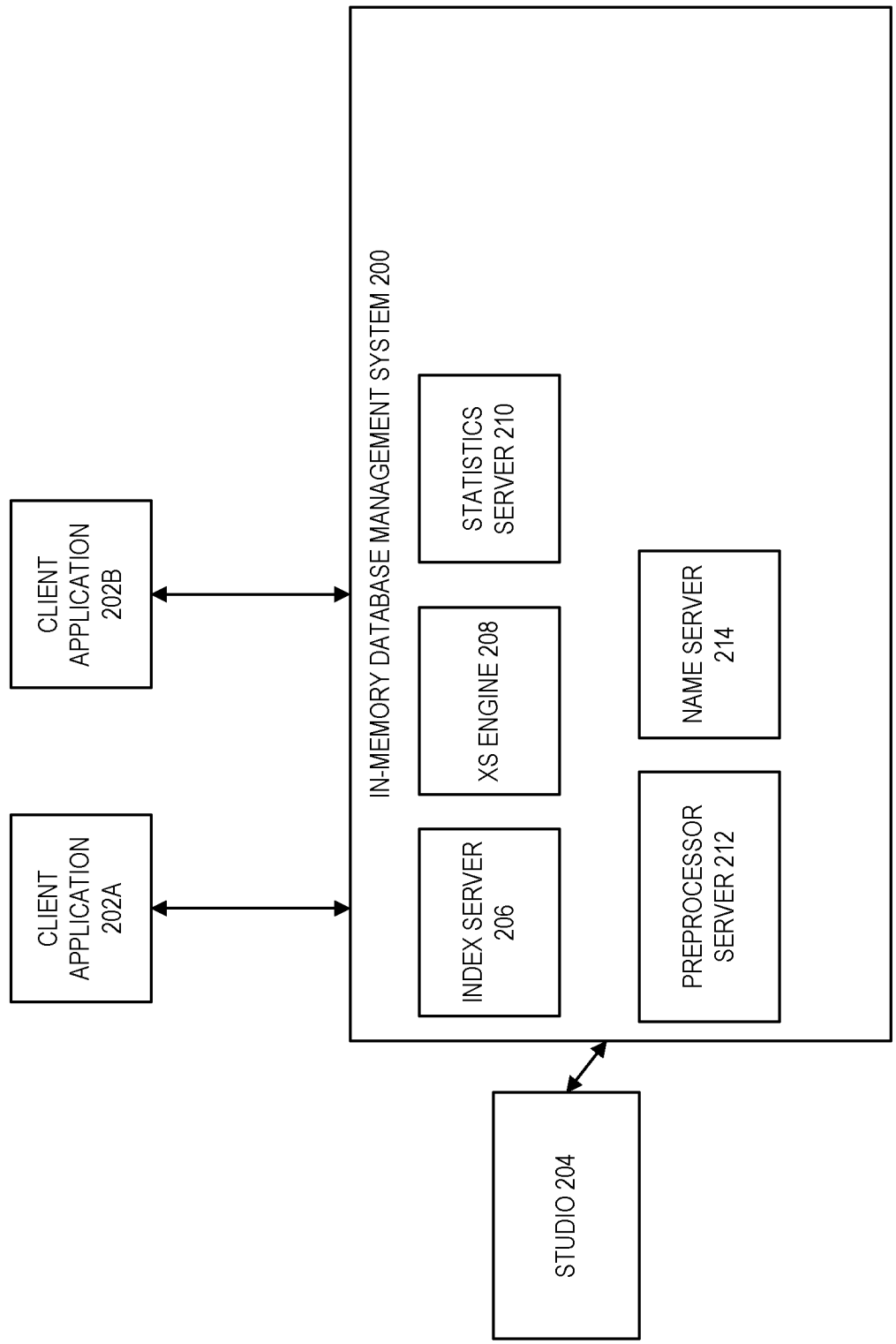
FIG. 2 is a diagram illustrating an in-memory database management system, including its client/external connection points, which can be kept stable in the case of disaster recovery to ensure stable service operations, in accordance with an example embodiment.

In some example embodiments the database 102 is an in-memory database. FIG. 2 is a diagram illustrating an in-memory database management system 200, including its client/external connection points, which can be kept stable in the case of disaster recovery to ensure stable service operations, in accordance with an example embodiment. It should be noted that one of ordinary skill in the art will recognize that sometimes an in-memory database management system 200 is also referred to as an in-memory database. Here, the in-memory database management system 200 may be coupled to one or more client applications 202A, 202B. The client applications 202A, 202B may communicate with the in-memory database management system 200 through a number of different protocols, including Structured Query Language (SQL), Multidimensional Expressions (MDX), Hypertext Transfer Protocol (HTTP), REST, and Hypertext Markup Language (HTML).

Also depicted is a studio 204, used to perform modeling or basic database access and operations management by accessing the in-memory database management system 200.

The in-memory database management system 200 may comprise a number of different components, including an index server 206, an XS engine 208, a statistics server 210, a preprocessor server 212, and a name server 214. These components may operate on a single computing device, or may be spread among multiple computing devices (e.g., separate servers).

The index server 206 contains the actual data and the engines for processing the data. It also coordinates and uses all the other servers.

The XS engine 208 allows clients to connect to the in-memory database management system 200 using web protocols, such as HTTP.

The statistics server 210 collects information about status, performance, and resource consumption from all the other server components. The statistics server 210 can be accessed from the studio 204 to obtain the status of various alert monitors.

The preprocessor server 212 is used for analyzing text data and extracting the information on which text search capabilities are based.

The name server 214 holds information about the database topology. This is used in a distributed system with instances of the database on different hosts. The name server 214 knows where the components are running and which data is located on which server.

Figure 3:
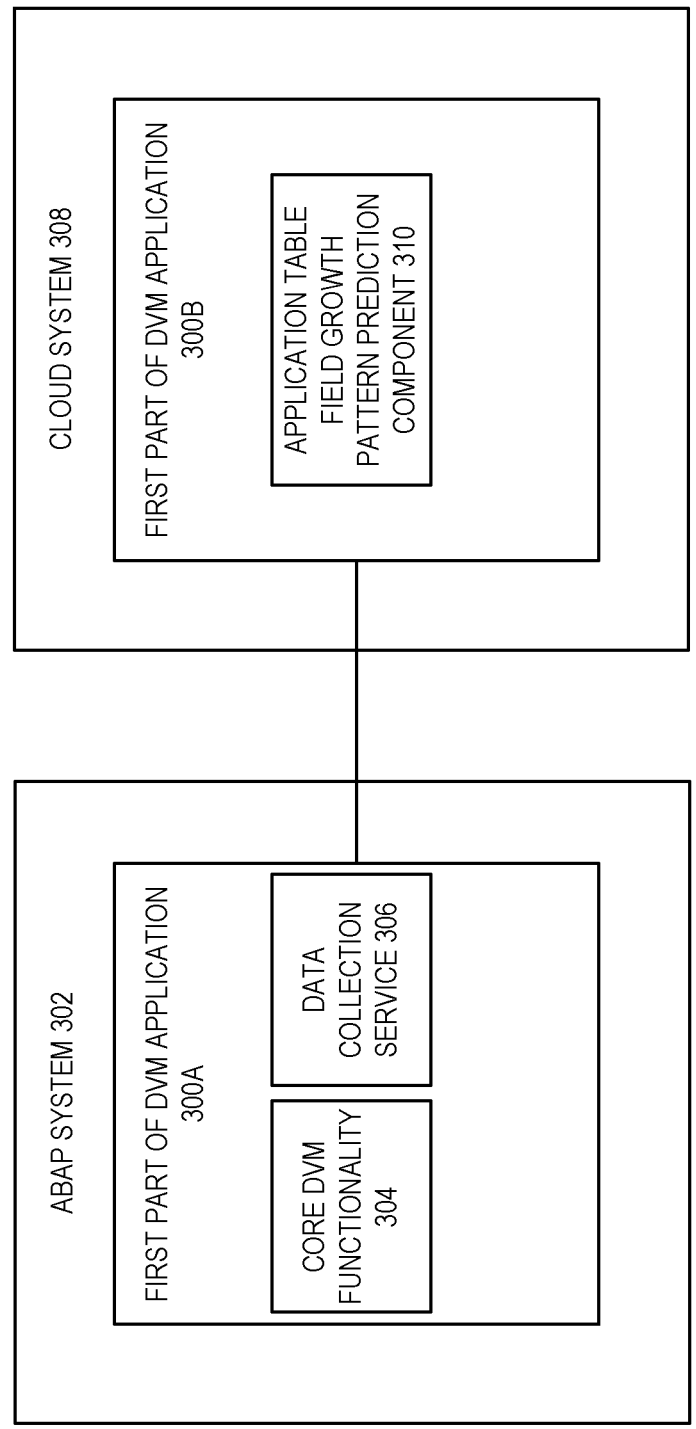
FIG. 3 is a block diagram illustrating a Data Volume Management (DVM) application, in accordance with an example embodiment.

Referring back to FIG. 1, one of the applications 108A-108E is a DVM application. In an example embodiment, the DVM application is actually deployed over two different types of systems. The first is an ABAP system, such as that depicted in FIG. 1. The second is a cloud system. FIG. 3 is a block diagram illustrating two parts 300A, 300B of a DVM application, in accordance with an example embodiment. Here, a first part 300A of the DVM application is implemented at ABAP system 302. ABAP system receives data from client systems (not pictured). The first part 300A of the DVM application may include core DVM functionality 304, which includes software modules for performing various typical DVM operations, such as monitoring database and/or table growth, monitoring executed archiving activities, trending to predict future growth and/or size, recommending suitable actions to system administrators or database operators. Also included is a data collection service 306, which in this context acts to perform a data collection operation on the snapshot of the database 102 to create or calculate the time distribution of new records (e.g., histogram). More particularly, the data collection service 306 searches the database 102 to identify fields of interest.

Separately, the second part 300B of the DVM application is implemented at cloud system 308. In an example embodiment, the cloud system may provide a cloud service and the second part 300B of the DVM application may be deployed to the cloud system 308 via a platform for building, deploying, and managing containerized application, such as Docker. In a further example embodiment, the second part 300B of the DVM application may be implemented in Python. An application table field growth pattern prediction component 310 may then act to predict a growth pattern for application table(s) based one or more time fields and one or more category fields in application tables.

Figure 4:
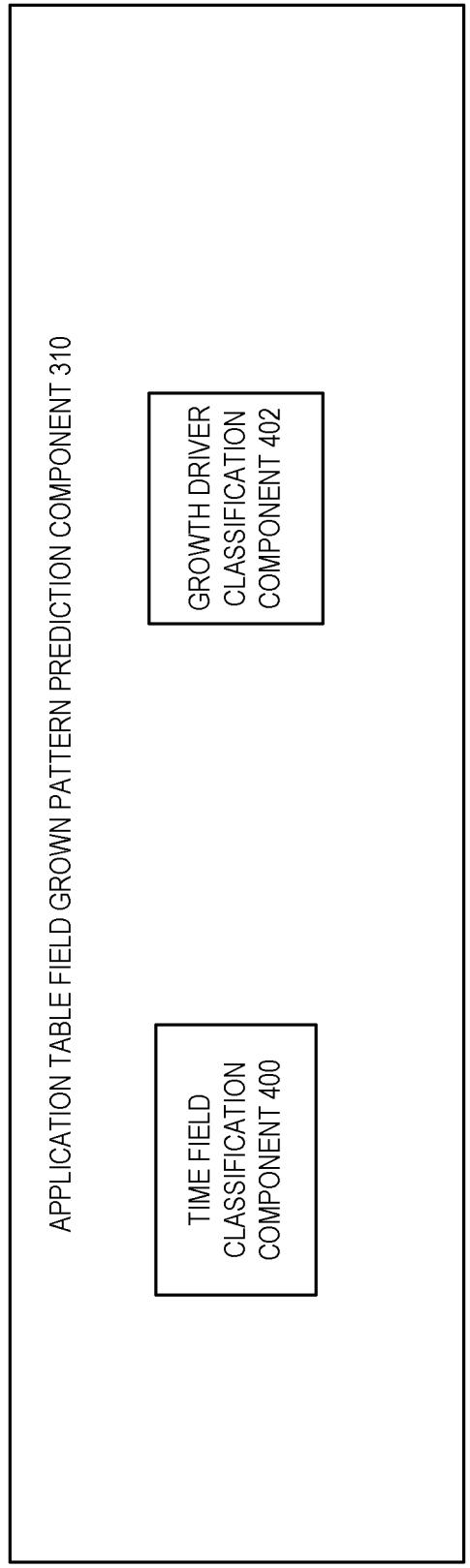
FIG. 4 is a block diagram illustrating an application field growth pattern prediction component in more detail, in accordance with an example embodiment.

FIG. 4 is a block diagram illustrating the application table field growth pattern prediction component 306 in more detail, in accordance with an example embodiment. Here, a time field classification component 400 and a growth driver classification component 402 are utilized.

Figure 5:
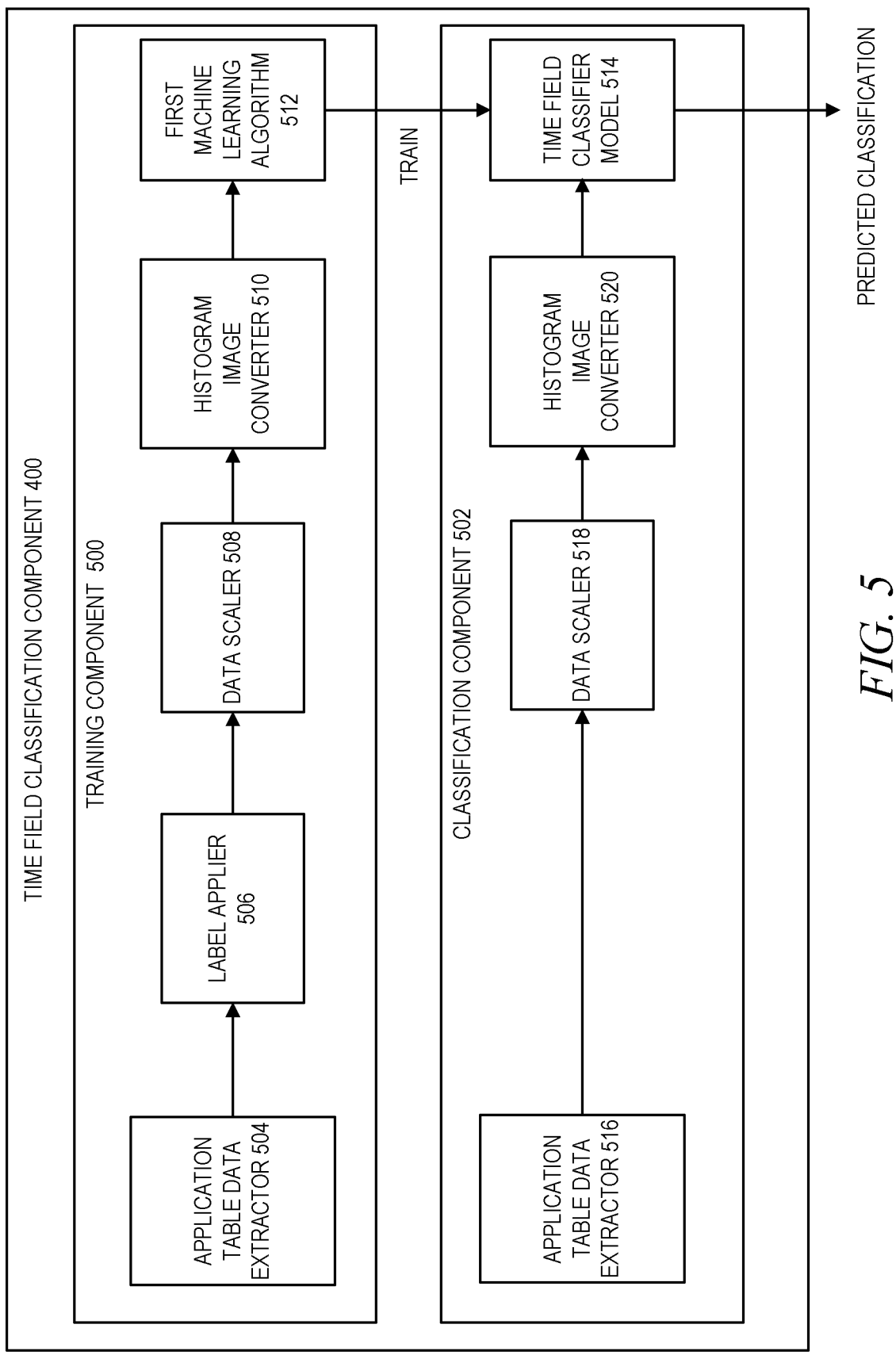
FIG. 5 is a block diagram illustrating a time field classification component in more detail, in accordance with an example embodiment.

FIG. 5 is a block diagram illustrating the time field classification component 400 in more detail, in accordance with an example embodiment. The time field classification component 400 may contain a training component 500 and a classification component 502. In the training component 500, an application table data extractor 504 extracts data from one or more application tables to form one or more histograms. The data extracted include one or more time fields of the one or more application tables, and the data contained therein. Using this data, the application table data extractor 504 is able to form a histogram for each of the one or more time fields, each histogram organized by time interval (e.g., month) and listing a record count indicating how many records exist in the application table(s) for that corresponding interval. Thus, if there are four time fields in the one or more application table, then four histograms are formed. A label applier 506 then applies one or more labels to each of these one or more histograms. The labels may be applied by, for example, a human labeler, or may be obtained or deduced from a database. The labels indicate a classification of the likelihood of whether the corresponding time field is a good predictor of growth.

A data scaler 508 then scales the values in each of the one or more histograms. The scaling may be performed by dividing the record count for each interval by the maximum record count of all the intervals, to arrive at a value between 0 and 1 for each record count. A histogram image converter 510 then converts each of the one or more (scaled) histograms to an image. The image may take the form of a line or bar graph, with time intervals on the horizontal axis and the (scaled) record count on the vertical axis.

The histogram images are then passed into a first machine learning algorithm 512, which trains a time field classifier model 514 based on the histogram images and their corresponding labels.

In an example embodiment, the first machine learning algorithm 512 may iterate among various weights that will be multiplied by various input variables and evaluate a loss function at each iteration, until the loss function is minimized, at which stage the weights for that stage are learned. The past training data may include manually labeled data. Specifically, the weights are multiplied by the input variables as part of a weighted sum operation, and the weighted sum operation is used by the loss function.

The first machine learning algorithm 512 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The time field classifier model 514 can also be retrained by passing new training data, some of which may have been labeled via user feedback, to the first machine learning algorithm 512 at a later time.

In an example embodiment, the first machine learning algorithm 512 is a random forest classifier. A random forest classifier operates by creating many trees, with each tree having some randomness built into it. The random forest classifier is then able to arrive at a decision by utilizing all of the predictions made by the many trees. For a classification task, the output of the random forest is, for example, the class selected by the most trees.

The classification component 502 may then utilize an application table data extractor 516, which extracts data from one or more application tables to form one or more histograms. Like with the extracted data in the training component 500, the data extracted include one or more time fields of the one or more application tables, and the data contained therein. Using this data, the application table data extractor 516 is able to form a histogram for each of the one or more time fields, each histogram organized by time interval (e.g., month) and listing a record count indicating how many records exist in the application table(s) for that corresponding interval. Thus, in some example embodiments the application table data extractor 516 is the same component as the application table data extractor 504 that is reused at classification time.

Likewise, a data scaler 518 then scales the values in each of the one or more histograms. The scaling may be performed by dividing the record count for each interval by the maximum record count of all the intervals, to arrive at a value between 0 and 1 for each record count. Thus, in some example embodiments the data scaler 518 is the same component as the data scaler 508 that is reused at classification time. A histogram image converter 520 then converts each of the one or more (scaled) histograms to an image. The image may take the form of a line or bar graph, with time intervals on the horizontal axis and the (scaled) record count on the vertical axis. Thus, in some example embodiments the histogram image converter 520 is the same component as the histogram image converter 510 that is reused at classification time. The one or more histograms are then passed to the time field classifier model 514 to predict classifications for the one or more histograms. Notably, there is no label applier 506 in the classification component 502, as the label of the data in this component will be applied as the prediction made by the time field classifier model 514.

Figure 6:
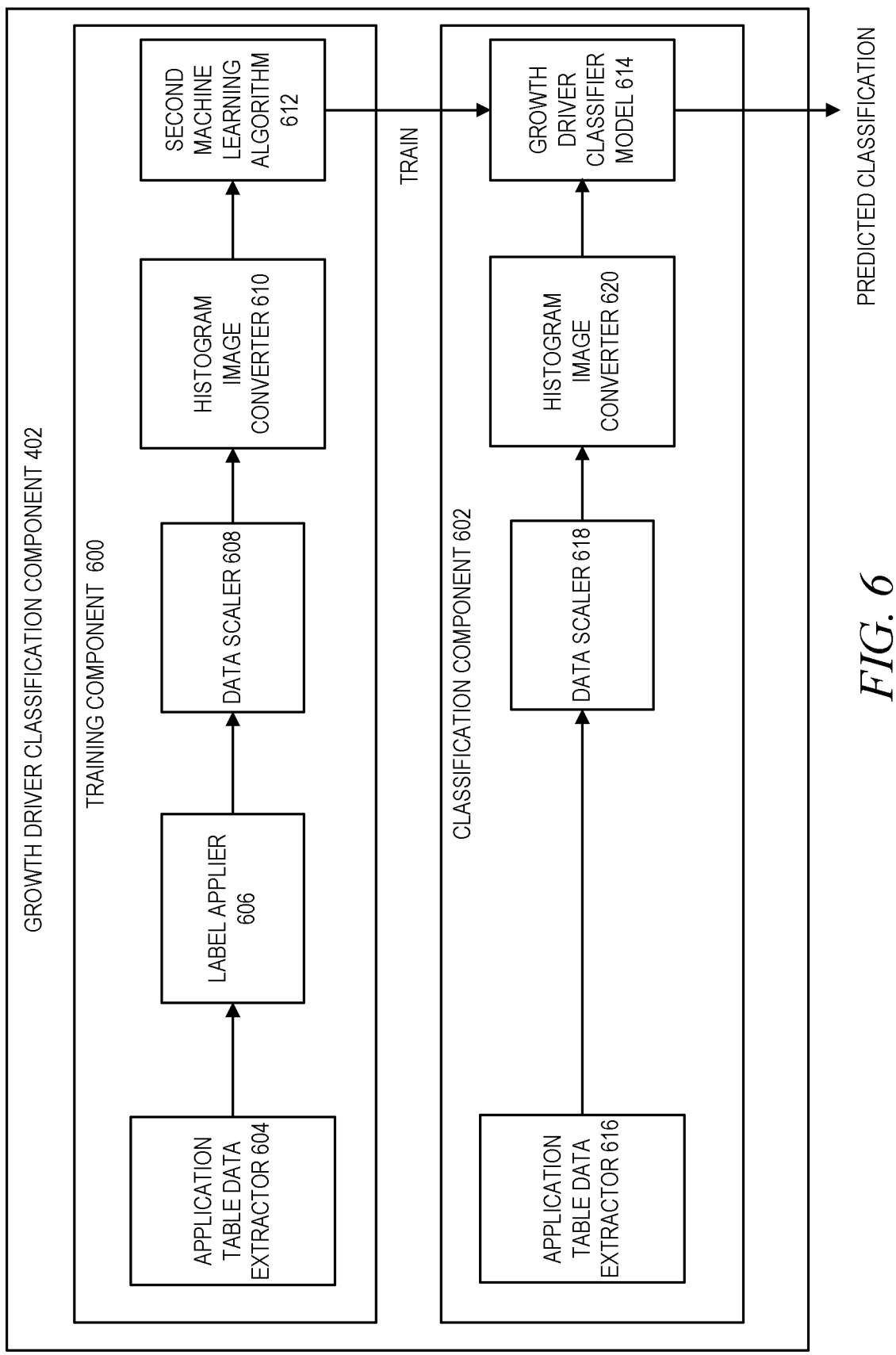
FIG. 6 is a block diagram illustrating a growth driver classifier in more detail, in accordance with an example embodiment.

FIG. 6 is a block diagram illustrating the growth driver classification component 402 in more detail, in accordance with an example embodiment. The growth driver classification component 402 may contain a training component 600 and a classification component 602. In the training component 600, an application table data extractor 604 extracts data from one or more application tables to form one or more histograms. The data extracted include one or more time fields of the one or more application tables, and the data contained therein. The data also includes one or more category fields on the one or more application tables. It should be noted that the one or more time fields may have been previously extracted by the time field classification component 400; if that is the case, then the actual extraction part need not be repeated here. Using this data, the application table data extractor 604 is able to form a histogram for each of the one or more time fields, each histogram organized by time interval (e.g., month) and listing a record count indicating how many records exist in the application table(s) for that corresponding interval, as well as a histogram for each of the one or more category fields, each histogram organized by time interval and listing a number of distinct values in the category field, over a corresponding time field, for that corresponding interval. Again, however, if the histograms for the time fields have already been created by the time field classification component 400 they need not be recreated here.

It should be noted that the histograms for the time fields may be limited to only those time fields that have been previously classified as being good candidates for predictors for growth (e.g., been assigned to a classification that is greater than or equal to a cutoff classification). This previous classification may have been made by the time field classification component 400 or been fed to the system.

Notably, the histograms for the one or more category fields wind up being histograms of various combinations of each of the one or more category fields and the one or more time fields that have not been limited out (due to failing to meet the cutoff classification).

A label applier 606 then applies one or more labels to each of the histograms corresponding to category fields. The labels may be applied by, for example, a human labeler, or may be obtained or deduced from a database. The labels indicate a classification of the likelihood of whether the corresponding time field is a good predictor of growth or the likelihood of whether the corresponding category field is relevant to driving growth. The classifications for whether the corresponding category field is relevant to driving growth include a first classification indicating relevancy toward driving growth, a second classification indicating non-relevancy towards driving growth, and a third classification indicating something in the middle. Indeed, any number of classification groups can be defined based on thresholds.

A data scaler 608 then scales the values in each of the one or more histograms corresponding to category fields. The scaling may be performed by dividing the distinct value count for each interval by the maximum distinct value count of all the intervals, to arrive at a value between 0 and 1 for each record count. A histogram image converter 610 then converts each of the one or more (scaled) histograms to an image. The image may take the form of a line or bar graph, with time intervals on the horizontal axis and the (scaled) distinct value count on the vertical axis.

The histogram images are then passed into second machine learning algorithm 612, which trains a growth driver classifier model 614 based on the histogram images and their corresponding labels.

In an example embodiment, the second machine learning algorithm 612 may iterate among various weights that will be multiplied by various input variables and evaluate a loss function at each iteration, until the loss function is minimized, at which stage the weights for that stage are learned. The past training data may include manually labeled data. Specifically, the weights are multiplied by the input variables as part of a weighted sum operation, and the weighted sum operation is used by the loss function.

The second machine learning algorithm 612 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The growth driver classifier model 614 can also be retrained by passing new training data, some of which may have been labeled via user feedback, to the second machine learning algorithm 612 at a later time.

In an example embodiment, the second machine learning algorithm 612 is a random forest classifier. A random forest classifier operates by creating many trees, with each tree having some randomness built into it. The random forest classifier is then able to arrive at a decision by utilizing all of the predictions made by the many trees. For a classification task, the output of the random forest is, for example, the class selected by the most trees.

It should also be noted that in some example embodiments, the growth driver classifier model 614 is not machine learned, and instead uses a rules-based approach that determines relevancy classifications based on statistical methods, such as standard deviation.

The classification component 602 may then utilize an application table data extractor 616, which extracts data from one or more application tables to form one or more histograms. Like with the extracted data in the training component 602, the data extracted include one or more time fields of the one or more application tables, one or more category fields of the one or more application tables, and the data contained therein. Using this data, the application table data extractor 616 is able to form a histogram for each combination of category field and (not limited out) time field, each histogram organized by time interval (e.g., month) and listing a count of how many distinct values exist in the category field in the application table(s) for that corresponding interval.

Likewise, a data scaler 618 then scales the values in each of the one or more histograms. The scaling may be performed by dividing the count of distinct values for each interval by the maximum distinct value count of all the intervals, to arrive at a value between 0 and 1 for each distinct value count. Thus, in some example embodiments the data scaler 618 is the same component as the data scaler 608 that is reused at classification time. A histogram image converter 620 then converts each of the one or more (scaled) histograms to an image. The image may take the form of a line or bar graph, with time intervals on the horizontal axis and the (scaled) distinct value count on the vertical axis. Thus, in some example embodiments the histogram image converter 620 is the same component as the histogram image converter 610 that is reused at classification time. The one or more histograms is then passed to the growth driver classifier model 614 to predict classifications for the one or more histograms. Notably, there is no label applier 606 in the classification component 602, as the label of the data in this component will be applied as the prediction made by the growth driver classifier model 614.

Figure 7:
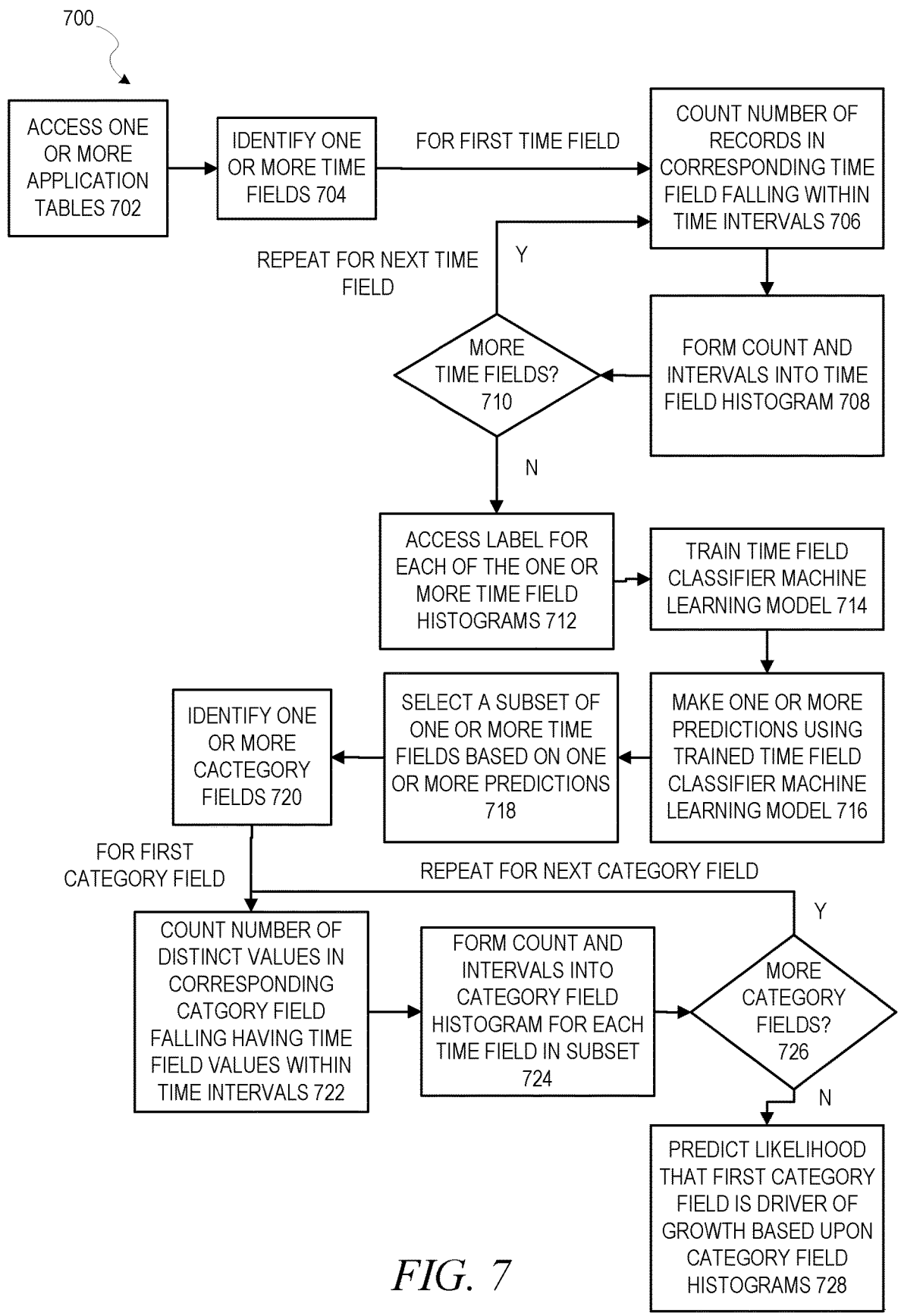
FIG. 7 is a flow diagram illustrating a method of using machine learned models to predict growth factors of fields of application tables, in accordance with an example embodiment.

FIG. 7 is a flow diagram illustrating a method 700 of using machine learned models to predict growth factors of fields of application tables, in accordance with an example embodiment. At operation 702, one or more application tables in a software database is accessed. At operation 704, one or more time fields of the one or more application tables is identified, each time field having a time value. A loop is then begun for each of the one or more time fields. At operation 706, a number of records appearing in the one or more application tables in corresponding time field having time values falling within each of a plurality of time intervals of a preset length is counted. At operation 708, a time field histogram is formed from the record counts and time intervals. At operation 710, it is determined if there are any more time fields. If so, then the method 700 loops back to operation 706 for the next time field;

If not, then at operation 712 a label for each of the one or more time field histograms is accessed. The label for a given time field histogram indicates a classification of a likelihood that the time field corresponding to the given time field histogram is a predictor of growth. At operation 714, a time field classifier machine learning model is trained by passing the one or more time field histograms and the one or more labels into a first machine learning algorithm. The first machine learning algorithm may be a random forest classifier. At operation 716 one or more predictions are made by the trained time field classifier machine learning model.

At operation 718, based on predictions made by the trained time field classifier machine learning model, a subset of one or more time fields classified as having a likelihood of being a predictor for growth above a threshold is selected. At operation 720, one or more category fields of the one or more application tables are identified, each category field being of a character type. In some example embodiments, the category fields identified are those with a small number (e.g., less than a predetermined threshold) of distinct values in the one or more application tables.

A loop is then begun for each of the one or more category fields. At operation 722, a number of distinct values appearing with time values falling within each of the plurality of time intervals in each of the subset of one or more time fields in another set of one or more application tables is counted. At operation 724, a growth driver histogram is formed from the distinct values and time intervals for each combination of the category field and time field in the subset of one or more time fields. At operation 726, it is determined if there are any more category fields. If so, the method 700 loops back to operation 722 for the next category field.

If not, then at operation 728 a likelihood that a first category field is a driver of growth based upon one or more growth driver histograms corresponding to the first category field is predicted. This prediction may be made by a rules-based model or by a machine learned growth driver classification model.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
  accessing one or more application tables in a software database;
  identifying one or more time fields of the one or more application tables, each time field having a time value;
  for each of the one or more time fields, counting a number of records appearing in the one or more application tables in the corresponding time field having time values falling within each of a plurality of time intervals of a preset length, and forming a time field histogram from the record counts and time intervals;
  accessing a label for each of the one or more time field histograms, the label for a given time field histogram indicating a classification of a likelihood that the time field corresponding to the given time field histogram is a predictor of growth; and
  training a time field classifier machine learning model by passing the one or more time field histograms and the one or more labels into a first machine learning algorithm.

Example 2. The system of Example 1, wherein the operations further comprise:
based on predictions made by the trained time field classifier machine learning model, selecting a subset of one or more time fields classified as having a likelihood of being a predictor for growth above a threshold;
identifying one or more category fields of the one or more application tables, each category field being of a character type;
for each of the one or more category fields, counting a number of distinct values appearing with time values falling within each of the plurality of time intervals in each of the subset of one or more time fields in another set of one or more application tables, and forming a growth driver histogram from the distinct values and time intervals for each combination of category field and time field in the subset of one or more time fields; and
predicting a likelihood that a first category field is a driver of growth based upon one or more growth driver histograms corresponding to the first category field.

Example 3. The system of Example 2, wherein the predicting a likelihood is performed using a growth driver classifier machine learning model trained by a second machine learning algorithm using one or more growth driver histograms and associated labels.

Example 4. The system of any of Examples 1-3, wherein the first machine learning algorithm is a random forest classifier.

Example 5. The system of any of Examples 1-4, wherein the operations further comprise:
  converting the one or more time field histograms to one or more images prior to passing the one or more time field histograms and the one or more labels into the first machine learning algorithm.

Example 6. The system of Example 2, wherein the predicting is performed by a rules-based model.

Example 7. The system of Example 2, wherein the operations further comprise using the predicted likelihood to help predict future sizes of application tables.

Example 8. A method comprising:
  accessing one or more application tables in a software database;
  identifying one or more time fields of the one or more application tables, each time field having a time value;
  for each of the one or more time fields, counting a number of records appearing in the one or more application tables in the corresponding time field having time values falling within each of a plurality of time intervals of a preset length, and forming a time field histogram from the record counts and time intervals;
  accessing a label for each of the one or more time field histograms, the label for a given time field histogram indicating a classification of a likelihood that the time field corresponding to the given time field histogram is a predictor of growth; and
  training a time field classifier machine learning model by passing the one or more time field histograms and the one or more labels into a first machine learning algorithm.

Example 9. The method of Example 8, further comprising:
  based on predictions made by the trained time field classifier machine learning model, selecting a subset of one or more time fields classified as having a likelihood of being a predictor for growth above a threshold;
  identifying one or more category fields of the one or more application tables, each category field being of a character type;
  for each of the one or more category fields, counting a number of distinct values appearing with time values falling within each of the plurality of time intervals in each of the subset of one or more time fields in another set of one or more application tables, and forming a growth driver histogram from the distinct values and time intervals for each combination of category field and time field in the subset of one or more time fields; and
  predicting a likelihood that a first category field is a driver of growth based upon one or more growth driver histograms corresponding to the first category field.

Example 10. The method of Example 9, wherein the predicting a likelihood is performed using a growth driver classifier machine learning model trained by a second machine learning algorithm using one or more growth driver histograms and associated labels.

Example 11. The method of any of Examples 8-10, wherein the first machine learning algorithm is a random forest classifier.

Example 12. The method of any of Examples 8-11, further comprising:
  converting the one or more time field histograms to one or more images prior to passing the one or more time field histograms and the one or more labels into the first machine learning algorithm.

Example 13. The method of Example 9, wherein the predicting is performed by a rules-based model.

Example 14. The method of Example 9, further comprising using the predicted likelihood to help predict future sizes of application tables.

Example 15. A non-transitory machine-readable medium storing instructions which, when executed by one or more processors, cause the one or more processors to perform operations comprising:
  accessing one or more application tables in a software database;
  identifying one or more time fields of the one or more application tables, each time field having a time value;
  for each of the one or more time fields, counting a number of records appearing in the one or more application tables in the corresponding time field having time values falling within each of a plurality of time intervals of a preset length, and forming a time field histogram from the record counts and time intervals;
  accessing a label for each of the one or more time field histograms, the label for a given time field histogram indicating a classification of a likelihood that the time field corresponding to the given time field histogram is a predictor of growth; and
  training a time field classifier machine learning model by passing the one or more time field histograms and the one or more labels into a first machine learning algorithm.

Example 16. The non-transitory machine-readable medium of Example 15, wherein the operations further comprise:
  based on predictions made by the trained time field classifier machine learning model, selecting a subset of one or more time fields classified as having a likelihood of being a predictor for growth above a threshold;
  identifying one or more category fields of the one or more application tables, each category field being of a character type;
  for each of the one or more category fields, counting a number of distinct values appearing with time values falling within each of the plurality of time intervals in each of the subset of one or more time fields in another set of one or more application tables, and forming a growth driver histogram from the distinct values and time intervals for each combination of category field and time field in the subset of one or more time fields; and
  predicting a likelihood that a first category field is a driver of growth based upon one or more growth driver histograms corresponding to the first category field.

Example 17. The non-transitory machine-readable medium of Example 16, wherein the predicting a likelihood is performed using a growth driver classifier machine learning model trained by a second machine learning algorithm using one or more growth driver histograms and associated labels.

Example 18. The non-transitory machine-readable medium of any of Examples 15-17, wherein the first machine learning algorithm is a random forest classifier.

Example 19. The non-transitory machine-readable medium of any of Examples 15-18, wherein the operations further comprise:
  converting the one or more time field histograms to one or more images prior to passing the one or more time field histograms and the one or more labels into the first machine learning algorithm.

Example 20. The non-transitory machine-readable medium of Example 16, wherein the predicting is performed by a rules-based model.

Figure 8:
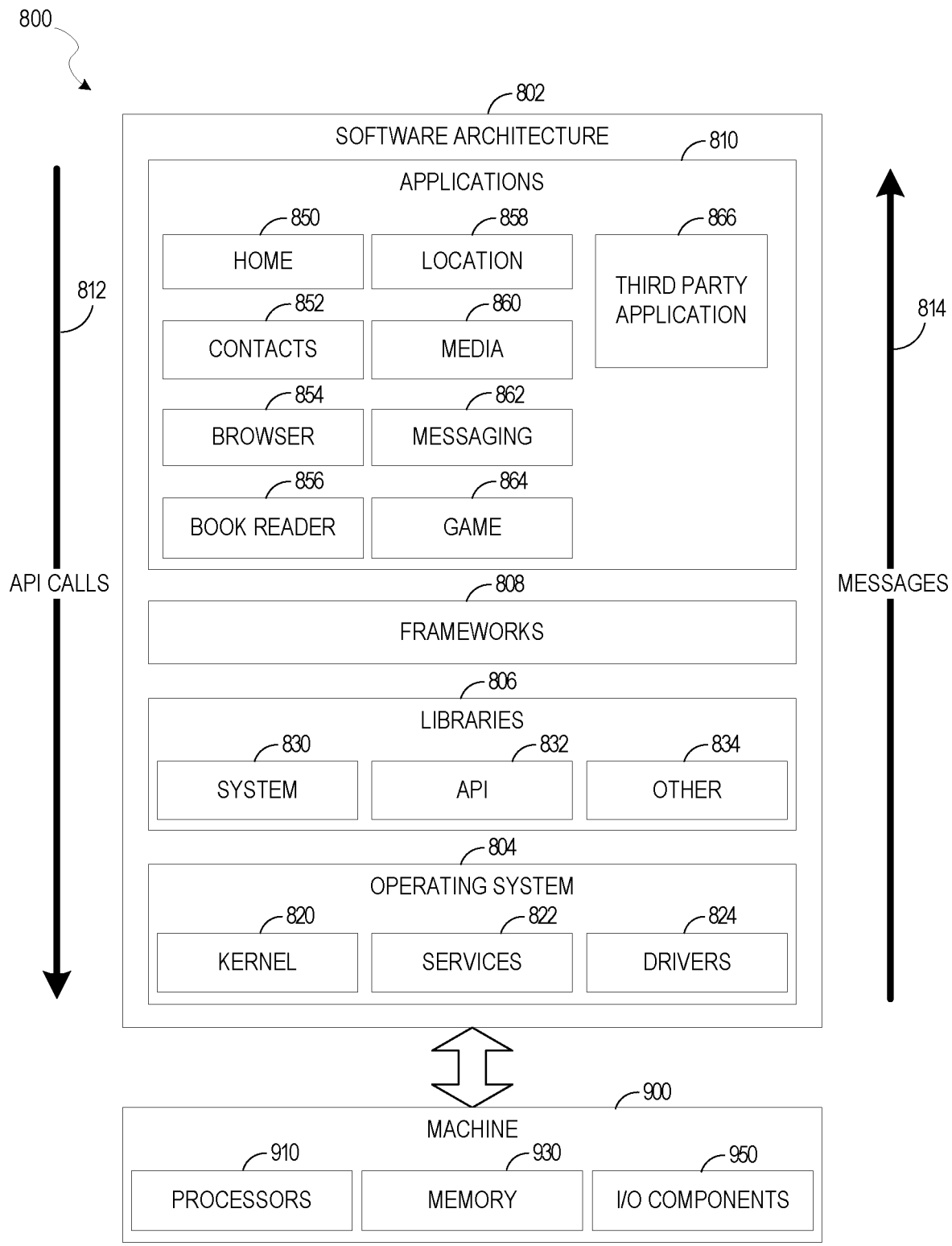
FIG. 8 is a block diagram illustrating a software architecture, which can be installed on any one or more of the devices described above.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke Application Program Interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. The applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
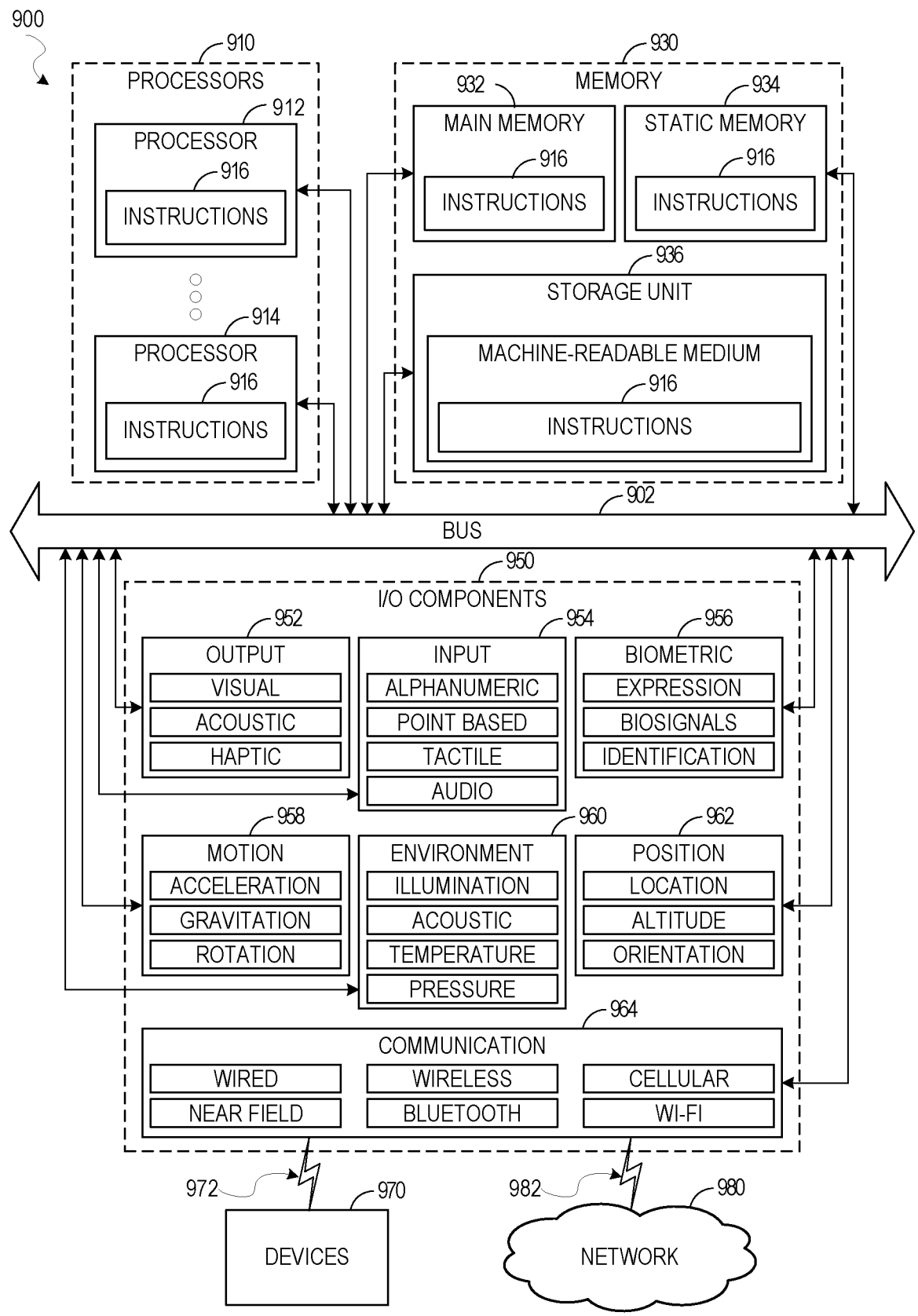
FIG. 9 illustrates a diagrammatic representation of a machine in the form of a computer system within which a set of instructions may be executed for causing the machine to perform any one or more of the methodologies discussed herein.

FIG. 9 illustrates a diagrammatic representation of a machine 900 in the form of a computer system within which a set of instructions may be executed for causing the machine 900 to perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   accessing one or more application tables in a software database;
   identifying one or more time fields of the one or more application tables, each time field having a time value;
   for each of the one or more time fields, counting a number of records appearing in the one or more application tables in the time field having time values falling within each of a plurality of time intervals of a preset length, and forming a time field histogram from the record counts and time intervals;
   accessing a label for each of the one or more time field histograms, the label for a given time field histogram indicating a classification of a likelihood that the time field corresponding to the given time field histogram is a predictor of growth; and
   training a time field classifier machine learning model by passing the one or more time field histograms and the one or more labels into a first machine learning algorithm.

2. The system of claim 1, wherein the operations further comprise:
   based on predictions made by the trained time field classifier machine learning model, selecting a subset of one or more time fields classified as having a likelihood of being a predictor for growth above a threshold;
   identifying one or more category fields of the one or more application tables, each category field being of a character type;
   for each of the one or more category fields, counting a number of distinct values appearing with time values falling within each of the plurality of time intervals in each of the subset of one or more time fields in another set of one or more application tables, and forming a growth driver histogram from the distinct values and time intervals for each combination of category field and time field in the subset of one or more time fields; and
   predicting a likelihood that a first category field is a driver of growth based upon one or more growth driver histograms corresponding to the first category field.

3. The system of claim 2, wherein the predicting a likelihood is performed using a growth driver classifier machine learning model trained by a second machine learning algorithm using one or more growth driver histograms and associated labels.

4. The system of claim 1, wherein the first machine learning algorithm is a random forest classifier.

5. The system of claim 1, wherein the operations further comprise:
converting the one or more time field histograms to one or more images prior to passing the one or more time field histograms and the one or more labels into the first machine learning algorithm.

6. The system of claim 2, wherein the predicting is performed by a rules-based model.

7. The system of claim 2, wherein the operations further comprise using the predicted likelihood to help predict future sizes of application tables.

8. A method comprising:
accessing one or more application tables in a software database;
identifying one or more time fields of the one or more application tables, each time field having a time value;
for each of the one or more time fields, counting a number of records appearing in the one or more application tables in the time field having time values falling within each of a plurality of time intervals of a preset length, and forming a time field histogram from the record counts and time intervals;
accessing a label for each of the one or more time field histograms, the label for a given time field histogram indicating a classification of a likelihood that the time field corresponding to the given time field histogram is a predictor of growth; and
training a time field classifier machine learning model by passing the one or more time field histograms and the one or more labels into a first machine learning algorithm.

9. The method of claim 8, further comprising:
based on predictions made by the trained time field classifier machine learning model, selecting a subset of one or more time fields classified as having a likelihood of being a predictor for growth above a threshold;
identifying one or more category fields of the one or more application tables, each category field being of a character type;
for each of the one or more category fields, counting a number of distinct values appearing with time values falling within each of the plurality of time intervals in each of the subset of one or more time fields in another set of one or more application tables, and forming a growth driver histogram from the distinct values and time intervals for each combination of category field and time field in the subset of one or more time fields; and
predicting a likelihood that a first category field is a driver of growth based upon one or more growth driver histograms corresponding to the first category field.

10. The method of claim 9, wherein the predicting a likelihood is performed using a growth driver classifier machine learning model trained by a second machine learning algorithm using one or more growth driver histograms and associated labels.

11. The method of claim 8, wherein the first machine learning algorithm is a random forest classifier.

12. The method of claim 8, further comprising:
converting the one or more time field histograms to one or more images prior to passing the one or more time field histograms and the one or more labels into the first machine learning algorithm.

13. The method of claim 9, wherein the predicting is performed by a rules-based model.

14. The method of claim 9, further comprising using the predicted likelihood to help predict future sizes of application tables.

15. A non-transitory machine-readable medium storing instructions which, when executed by one or more processors, cause the one or more processors to perform operations comprising:
accessing one or more application tables in a software database;
identifying one or more time fields of the one or more application tables, each time field having a time value;
for each of the one or more time fields, counting a number of records appearing in the one or more application tables in the time field having time values falling within each of a plurality of time intervals of a preset length, and forming a time field histogram from the record counts and time intervals;
accessing a label for each of the one or more time field histograms, the label for a given time field histogram indicating a classification of a likelihood that the time field corresponding to the given time field histogram is a predictor of growth; and
training a time field classifier machine learning model by passing the one or more time field histograms and the one or more labels into a first machine learning algorithm.

16. The non-transitory machine-readable medium of claim 15, wherein the operations further comprise:
based on predictions made by the trained time field classifier machine learning model, selecting a subset of one or more time fields classified as having a likelihood of being a predictor for growth above a threshold;
identifying one or more category fields of the one or more application tables, each category field being of a character type;
for each of the one or more category fields, counting a number of distinct values appearing with time values falling within each of the plurality of time intervals in each of the subset of one or more time fields in another set of one or more application tables, and forming a growth driver histogram from the distinct values and time intervals for each combination of category field and time field in the subset of one or more time fields; and
predicting a likelihood that a first category field is a driver of growth based upon one or more growth driver histograms corresponding to the first category field.

17. The non-transitory machine-readable medium of claim 16, wherein the predicting a likelihood is performed using a growth driver classifier machine learning model trained by a second machine learning algorithm using one or more growth driver histograms and associated labels.

18. The non-transitory machine-readable medium of claim 15, wherein the first machine learning algorithm is a random forest classifier.

19. The non-transitory machine-readable medium of claim 15, wherein the operations further comprise:
converting the one or more time field histograms to one or more images prior to passing the one or more time field histograms and the one or more labels into the first machine learning algorithm.

20. The non-transitory machine-readable medium of claim 16, wherein the predicting is performed by a rules-based model.

\* \* \* \* \*